(12) United States Patent
Kashiwakura (10) Patent No.: US 8,160,828 B2
(45) Date of Patent: Apr. 17, 2012

(54) APPARATUS, METHOD AND PROGRAM FOR DESIGN VALIDITY VERIFICATION OF ELECTRONIC CIRCUIT BOARD WITH REGARD TO POWER SUPPLY NOISE SUPPRESSION

(75) Inventor: Kazuhiro Kashiwakura, Tokyo (JP)

(73) Assignee: NEC Corporation, Tokyo (JP)

( * ) Notice: Subject to any disclaimer, the term of this patent is extended or adjusted under 35 U.S.C. 154(b) by 488 days.

(21) Appl. No.: 12/410,622

(22) Filed: Mar. 25, 2009

(65) Prior Publication Data
US 2009/0248343 A1 Oct. 1, 2009

(51) Int. Cl.
*G01R 19/00* (2006.01)
*G06F 9/455* (2006.01)

(52) U.S. Cl. .......................... 702/64; 716/115
(58) Field of Classification Search ............. 702/64
See application file for complete search history.

(56) References Cited

U.S. PATENT DOCUMENTS

| | | | |
|---|---|---|---|
| 6,215,076 B1 * | 4/2001 | Inagawa et al. | 174/261 |
| 6,924,651 B2 * | 8/2005 | Osaka et al. | 324/628 |
| 7,127,688 B2 * | 10/2006 | Ling et al. | 716/115 |

FOREIGN PATENT DOCUMENTS

| | | |
|---|---|---|
| JP | 2005031850 A | 2/2005 |
| JP | 2005251223 A | 9/2005 |

* cited by examiner

*Primary Examiner* — Jonathan C Teixeira Moffat (57) ABSTRACT

Disclosed is a method for design validity verification of an electronic circuit board with regard to power supply noise, wherein with regard to an i-th LSI (i=1 to n) on the electronic circuit board, an input voltage $Vin[i]$ to the LSI from the printed circuit board is given by $Vin[i]=VDD-Zlsi[i]\times VDD/(Zlsi[i]+Z11[i])$, where $Zlsi[i]$ is an input impedance characteristic and $Z11[i]$ is a reflected impedance characteristic viewed from a position at which the i-th LSI is mounted, being a characteristic with the i-th LSI omitted from the whole of the electronic circuit board and a judgment is made as to whether or not a reflected voltage $Vr[i]=Vin[i]\times(Zlsi[i]+Z11[i])/(Zlsi[i]-Z11[i])$ satisfies $|Vr[i]|\leq \Delta V$ (power supply variation tolerance range).

13 Claims, 9 Drawing Sheets

21: POWER SUPPLY LAYER
24: INSULATOR   22: GND LAYER

FIG. 5B

TRANSMISSION LINE MODEL

FIG. 5C

RESISTOR   INDUCTOR
    CAPACITOR

FIG. 5D

PRINTED CIRCUIT BOARD MODEL
LSI MODEL
CAPACITOR MODEL
TRANSMISSION LINE MODEL

APPARATUS, METHOD AND PROGRAM FOR DESIGN VALIDITY VERIFICATION OF ELECTRONIC CIRCUIT BOARD WITH REGARD TO POWER SUPPLY NOISE SUPPRESSION

REFERENCE TO RELATED APPLICATION

This application is based on and claims the benefit of the priority of Japanese patent application No. 2008-078467 filed on Mar. 25, 2008, the disclosure of which is incorporated herein in its entirety by reference thereto.

FIELD OF THE INVENTION

The present invention relates to power supply noise analysis technology, and in particular relates to a validity verification device, method and program for power supply noise suppression in an electronic circuit board.

BACKGROUND

Semiconductor electronic components such as LSI (Large-Scale Integrated circuit) mounted on electronic circuit boards have undergone advancements in terms of higher signal speed and lower power supply voltage. This means that power supply noise has an influence upon stable operation and quality of the electronic circuit. Specifically, the suppression of power supply noise, referred to as "power integrity (PI)" is essential in the design of an electronic circuit.

In the design phase of an electronic circuit board (referred to also as a "printed board" or "printed circuit board" below), various proposals have been made heretofore with regard to methods of suppressing and analyzing power supply noise.

For example, Patent Document 1 discloses a method of evaluating the characteristics of a printed circuit board wherein whether design of a printed circuit board that suppresses variations in power supply voltage and prevents an unwanted electromagnetic emission due to resonance of the power supply circuitry could be achieved is evaluated, during or after creation of a board layout prior to manufacturing of the board. The method includes the steps of:

calculating the impedance characteristic of the power supply circuitry within the board as seen from the power supply-terminal connection position of each active element mounted on the printed circuit board;

calculating the impedance characteristic from the power supply-terminal connection position to a capacitor element connected at a position nearest to this connection position; and determining whether resonance will occur within the power supply circuitry by comparing any among the sizes, phases, real parts or imaginary parts of the impedance characteristic of the power supply circuitry and of the impedance characteristic up to the capacitor element. This method extracts impedance from power supply-to-ground design information, calculates resonance of the board and evaluates the validity of the design. However, it does not analyze power supply noise taking the characteristic of a LSI-chip into consideration. That is, the method does not analyze power supply noise that propagates along the printed circuit board from the LSI chip.

Patent Document 2 discloses a power supply noise analysis method as a method that takes into account power supply noise that propagates along a printed circuit board from an LSI chip. This method makes it possible to analyze power supply noise within a semiconductor integrated circuit taking the effect of a printed board into account and to analyze power supply noise on the printed board generated by the semiconductor integrated circuit. This method includes the steps of:

dividing the semiconductor integrated circuit into a plurality of first unit areas;

expressing a power line, circuit and circuit current consumption of each first unit area by a simplified power supply network, capacitance and current source;

obtaining a model of the overall semiconductor integrated circuit by compiling the power supply networks, capacitances and current sources with regard to the plurality of first unit areas; dividing the printed board on which the semiconductor integrated circuit is mounted into a plurality of second unit areas;

expressing the power supply layer of each second unit area by a power supply network and capacitance;

obtaining a model of the overall printed board by compiling the power supply networks regarding the plurality of second unit areas; and solving a circuit Equation by combining the model of the overall semiconductor integrated circuit and the model of the overall printed board.

In accordance with this method of analyzing power supply noise, the power supply is analyzed by combining the model for analyzing power supply noise of the semiconductor integrated circuit and the model for analyzing power supply noise of the printed board. As a result, with regard to the semiconductor integrated circuit of interest, the influence of power supply noise generated by another semiconductor integrated circuit on the printed board can be taken into consideration and it is possible to analyze power supply noise that is generated by the semiconductor integrated circuit and propagates along the printed board.

[Patent Document 1]
JP Patent Kokai Publication No. JP-P2005-251223A
[Patent Document 2]
JP Patent Kokai Publication No. JP-P2005-31850A The entire disclosures of Patent Documents 1 and 2 are incorporated herein by reference thereto. The following analyses are given by the present invention.

The related technology (for example, Patent Document 1) relies solely upon the characteristics of a printed board and bypass condenser (bypass capacitor) and does not take into account the behavior of the LSI chip that is the source of noise. As a result, even if the amount of noise produced by the LSI chip is small, measures for dealing with the power supply noise are taken as an inevitable consequence and there are instances where this leads to excessive quality, i.e., an increase in cost.

An increase in the speed of a semiconductor device causes an increase in power supply noise, and a reduction in voltage causes a reduction in the immunity to power supply noise. This makes it difficult to design the printed board.

Thus, although it has become essential to suppress power supply noise in a printed board, Patent Document 1 does not clearly set forth a method of precisely analyzing power supply noise.

On the other hand, the other related technology (Patent Document 2) makes it possible to take into account the influence of power supply noise generated by another semiconductor integrated circuit on a printed board and to analyze power supply noise that is generated by a semiconductor integrated circuit and propagates along the printed board. However, the invention of Patent Document 2 solves a circuit Equation by combining models of the overall semiconductor integrated circuits and the model of the overall printed board.

In this way, the abovementioned related technology is completely different from design validity verification technology of the present invention, as described below.

SUMMARY

The inventors of the present invention arrived at a finding of the necessity of verifying design validity with regard to power supply noise suppression based on modeling of power supply noise in an electronic circuit board of a printed circuit board.

It is an object of the present invention to provide a method, a apparatus, and a program that analyze power supply noise on an electronic circuit board and that enable design validity verification of the electronic circuit board with regard to power supply noise suppression.

The invention is summarized as follows.

According to a first aspect of the present invention, there is provided a method (apparatus, program, computer readable recording medium) for verifying design validity of an electronic circuit board on which a semiconductor device is mounted, the method including obtaining a reflected voltage at the semiconductor device with respect to a voltage inputted to the semiconductor device from the electronic circuit board side; and making a judgment as to whether or not the reflected voltage is within a tolerance range of power supply variation that assures operation of the semiconductor device to performing verification of design validity.

In the present invention, the reflected voltage at the semiconductor device with respect to an input voltage from the electronic circuit board side is obtained from a reflection coefficient prescribed based on a power supply-to-ground input impedance of the semiconductor device on the electronic circuit board, and a reflected impedance characteristic of all the electronic circuit board omitting the semiconductor device.

In the present invention, assuming that n (n is a prescribed positive integer) semiconductor devices are mounted on the electronic circuit board, a voltage Vin[i] inputted to the semiconductor device from the electronic circuit board is given by $$Vin[i]=VDD-Zlsi[i] \times VDD/(Zlsi[i]+Z11[i])$$

where Zlsi[i] is an input impedance characteristic of an i-th (i=1 to n) of the semiconductor devices, Z11[i] is a reflected impedance characteristic which is viewed from a position at which the i-th semiconductor device is mounted and which is a characteristic with the i-th semiconductor device omitted from the electronic circuit board, and VDD is a power supply voltage.

The reflected voltage Vr[i] is obtained from $$Vr[i]=Vin[i] \times (Zlsi[i]+Z11[i])/(Zlsi[i]-Z11[i]).$$

A judgment is made as to whether or not a condition that an absolute value |Vr[i]| of the reflected voltage Vr[i] is less than or equal to a power supply variation tolerance range ΔV, $$|Vr[i]| \leq \Delta V$$

is satisfied.

In the present invention, with v=ΔV/VDD, which is a ratio of the power supply variation tolerance range ΔV and the power supply voltage VDD, when there is a semiconductor device for which Z11[i] and Zlsi[i] do not satisfy the following conditional expression:

$$0 \leq Z11[i] \leq \{2v+1+\sqrt{(8v+1)}\} \times Zlsi[i]/\{2(1-v)\}$$

a judgment is made that a design is not valid, and when the conditional expression is satisfied for each of all semiconductor devices mounted on the electronic circuit board, a judgment is made that the design is valid.

According to the present invention, it is possible to verify design validity with respect to power supply noise suppression in an electronic circuit board.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Before describing verification of design validity of an electronic circuit board according to the present invention, a description is given of a power supply noise analysis method according to the reflection theory.

Figure 7A:
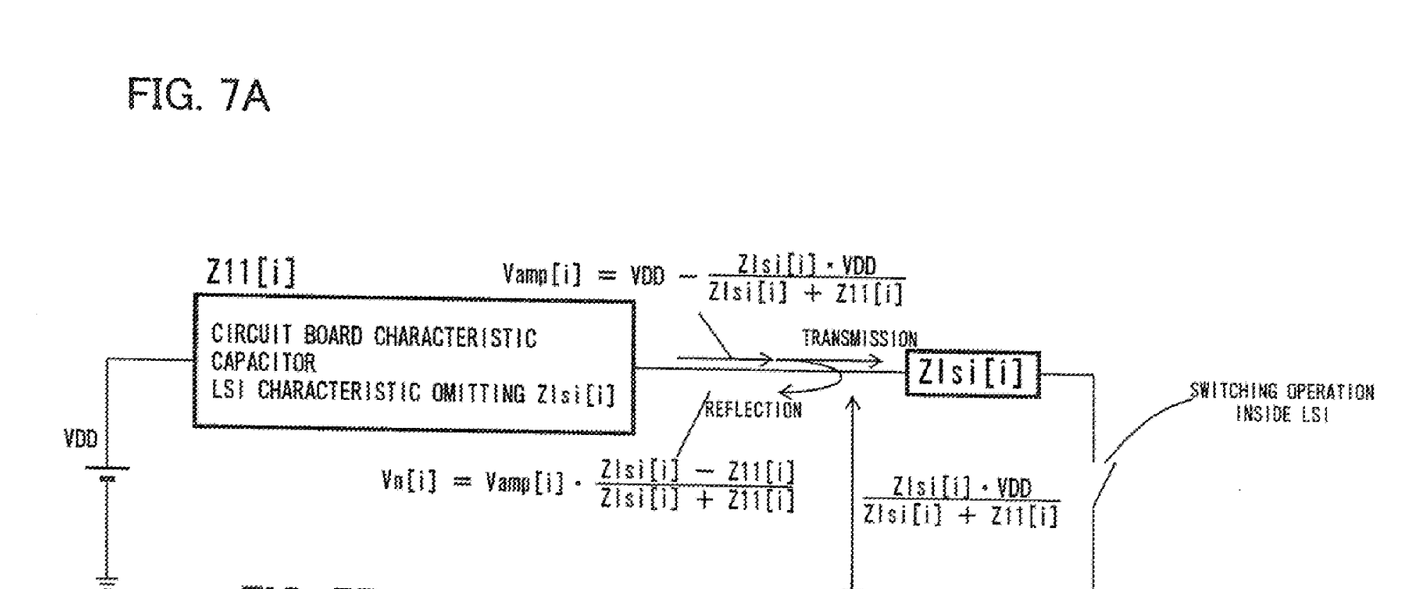
FIG. 7 is a diagram describing power supply noise analysis in the exemplary embodiment of the present invention.
Figure 7B:
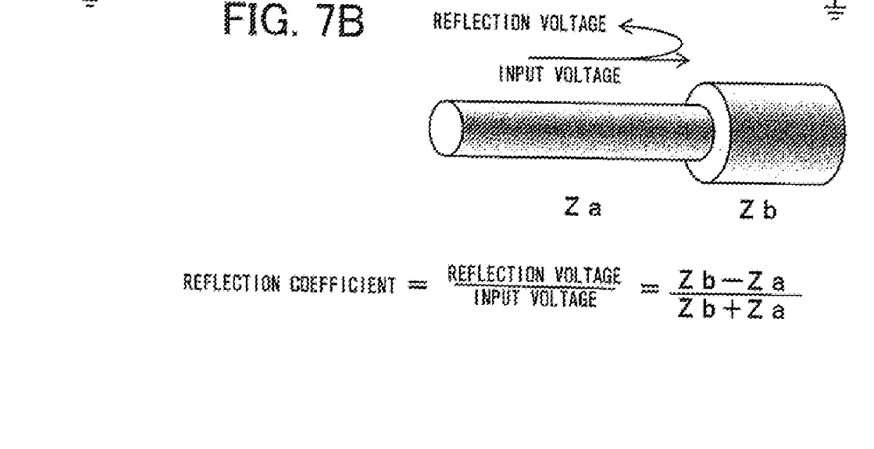

FIG. 7A shows a concept of the present invention, and FIG. 7B shows a concept of the reflection theory that forms a basis of the invention. In general, when transmission lines of different characteristic impedance are in contact, reflection occurs. Assume that these characteristic impedances are Za and Zb. With the ratio of reflected voltage to input voltage as a reflection coefficient r, this reflection coefficient r is calculated using Za and Zb as follows:

$$r=\{Zb-Za\}/\{Zb+Za\} \quad (1)$$

A connection of an electronic circuit board (referred to as printed circuit board) and a semiconductor device (LSI) can be regarded as a connection of transmission lines of different impedances.

An output buffer (for example refer to reference numeral 27 of FIG. 3, to be described later) of an LSI has a full swing from a ground potential GND to a power supply potential VDD and an input voltage from the printed circuit board to the LSI may be regarded as equivalent to VDD.

At a contact point of the printed circuit board and the LSI, a reflected voltage Vr with respect to the power supply voltage VDD occurs, and this is equivalent to power supply noise.

Since the operation assurance of an LSI includes a tolerance value of $\pm \Delta V$ in a power supply variation, the reflected voltage Vr is preferably is within a range of $\pm \Delta V$.

It is assumed that n (n is a prescribed positive integer) LSIs are mounted on the printed circuit board and that a characteristic (input impedance) of the i-th LSI is Zlsi[i] where i=1 to n.

A reflected impedance characteristic (Z11) which is viewed from a position at which the i-th LSI is mounted, and which is a characteristic with the i-th LSI omitted from the circuit board, is assumed to be Z11[i].

Since the power supply noise is caused by a switching operation inside an LSI (for example, in a CMOS LSI, a logic 0/1 switching operation), a simplified model of FIG. 7A can be adopted. At an interface (mounting position) between the i-th LSI and the printed circuit board, the maximum value being the power supply voltage VDD, and the minimum value being a voltage obtained by dividing the power supply voltage VDD by Z11[i] and Zlsi[i], that is, $$VDD \cdot Z11[i]/(Z11[i]+Zlsi[i]) \quad (2)$$

are applied to input of the i-th LSI. Therefore, the noise voltage Vin[i], which has an amplitude of the difference between the maximum value VDD and the minimum value VDD·Z11[i]/(Z11[i]+Zlsi[i]), is applied to the i-th LSI, as defined by the following Equation.

$$Vin[i]=VDD-Zlsi[i] \times VDD/(Zlsi[i]+Z11[i]) \quad (3)$$

In general, the impedances Z11[i] and Zlsi[i] are not equal. As a result, the effects of reflection and transmission occur.

From the reflection Equation of FIG. 7B, the reflected noise Vr[i] at the i-th LSI is given by:

$$Vr[i]/Vin[i]=(Zlsi[i]-Z11[i])/(Zlsi[i]+Z11[i]) \quad (4)$$

The reflected noise Vr[i] spreads over the entire printed circuit board. From Equation (4), in general Vr[i] is represented by a complex number with a real part and an imaginary part.

By calculating a transmission impedance from the i-th LSI to an arbitrary LSI, the propagation of the noise Vr[i] flowing from the i-th LSI to the printed circuit board can be calculated.

Figure 2A:
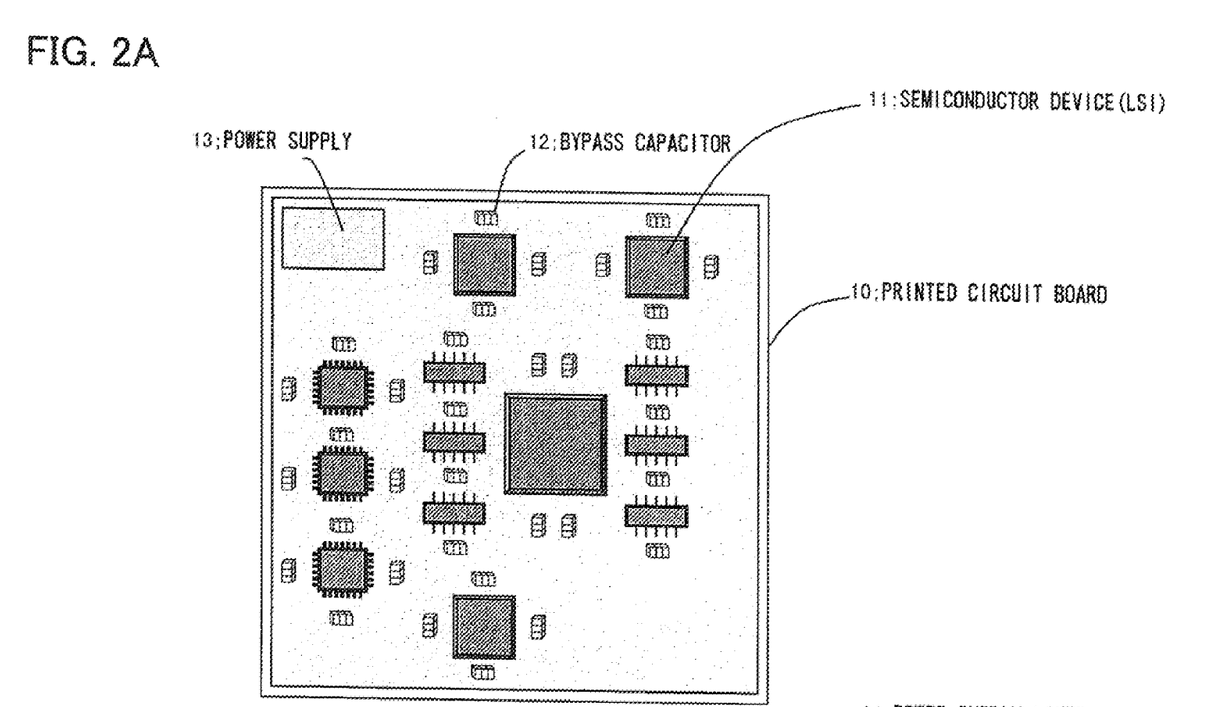
FIG. 2 is a diagram describing a configuration example of an electronic circuit board (printed circuit board).
Figure 2B:
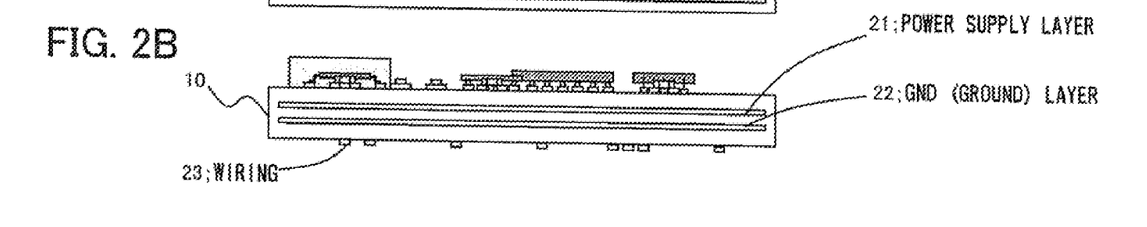

As shown in FIG. 2A, for example, electronic components such as a semiconductor device (LSI), a capacitor (such as a bypass condenser) 12, and the like, are mounted on the printed circuit board. In general, as shown in FIG. 2B, a multi-layer printed circuit board is provided with, for example, a power supply layer (power supply wiring layer) 21 and a GND layer (GND wiring layer) 22, with insulating resin of the printed circuit board 10 sandwiched therebetween. A power supply is provided through these layers from a power supply 13 to the LSI 11.

An LSI model (impedance characteristic model) is obtained by finding an impedance characteristic by a method of driving an actual device and calculating power supply-ground impedance (Z parameter) of an LSI from power supply voltage and power supply current (V-I characteristic), or by measuring return loss (S parameter S11) and converting to the Z parameter. In case of a semiconductor model (SPICE model and the like), the impedance characteristic may be found by a similar method from simulation. Below, a description is given concerning a method of obtaining the input impedance between the power supply and ground of the LSI, from the number of output signals and driving capability thereof, based on design information of the LSI.

Figure 3:
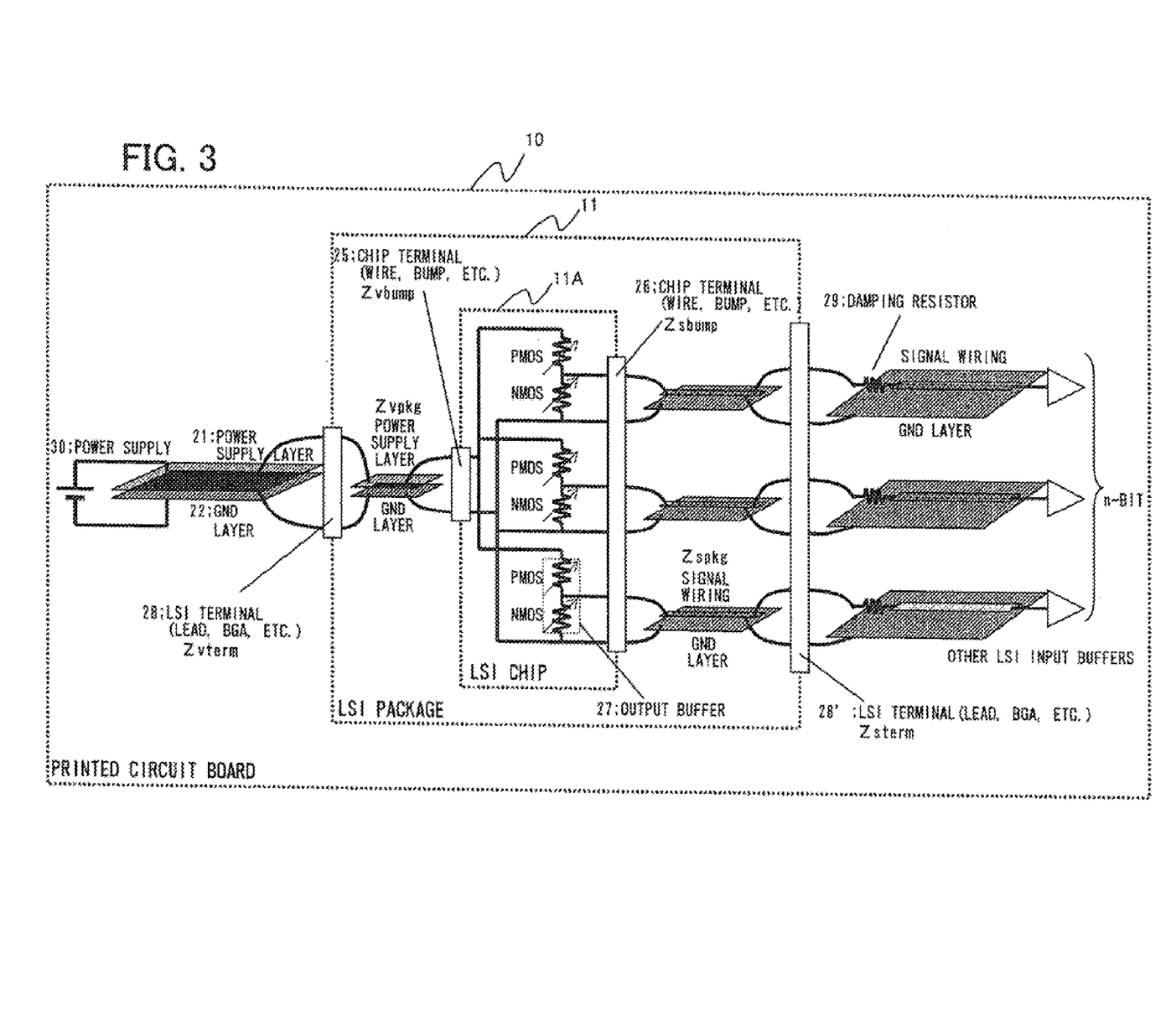
FIG. 3 is a diagram showing a model of an LSI mounted circuit board.

FIG. 3 is a diagram showing a model of the printed circuit board on which the LSI is mounted. FIG. 3 schematically shows a connection configuration in the printed circuit board 10, of a power supply 30, power supply layer 21, a ground layer 22, an LSI (LSI package) 11, an LSI terminal (lead or BGA (Ball Grid Array) or the like) 28, a power supply layer and ground layer for the LSI package, an LSI chip 11A, a chip terminal 25 (wire, bump, or the like), n output buffers 27, a chip terminal (wire, bump, or the like) 26, signal wiring/GND layers, an LSI terminal (lead, BGA (Ball Grid Array)) 28', and n-bit signal wiring/GND layers.

A characteristic impedance between the power supply and ground of an LSI terminal part is Zvterm, and a characteristic impedance of signal of the LSI terminal part is Zsterm;

a characteristic impedance between the power supply and ground of an LSI package part is Zvpkg, and a characteristic impedance of signal of the LSI package part is Zspkg; and a characteristic impedance between the power supply and ground of a chip terminal part is Zvbump, and a characteristic impedance of signal of the chip terminal part is Zsbump. Since the influence of these is small in comparison with the output impedance Rout and the printed circuit board characteristic, to be described later, even without these information, the power supply noise analysis can be performed, although with less accuracy.

The input impedance between the power supply and GND of the LSI can be calculated by the following Equation (5).

$$Zlsi=Zvterm+Zvpkg+Zvbump+\{Rout+Zsbump+Zspkg+Zsterm+Rs+Z0\}/n \quad (5)$$

If Zvterm, Zsterm, Zvpkg, Zspkg, Zvbump, and Zsbump are omitted, the above Equation simplifies to $$Zlsi=\{Rout+Rs+Z0\}/n \quad (6)$$

From Equation (6), the input impedance Zlsi between the power supply and GND of the LSI is equal to the sum of the output impedance Rout of signal output, the characteristic impedance Z0 of the wiring, and the damping resistance Rs, divided by the number of signal lines n.

The same output impedance and the same wiring characteristic impedance and damping resistance are assumed for all. With different impedance, a calculation of a combined resistance is performed. That is, as a required resistance value R, $$1/R=1/R1+1/R2+\ldots+1/Rn \quad (7)$$

This can be obtained even if the respective Rout, Rs, and Z0 are different.

Figure 4:
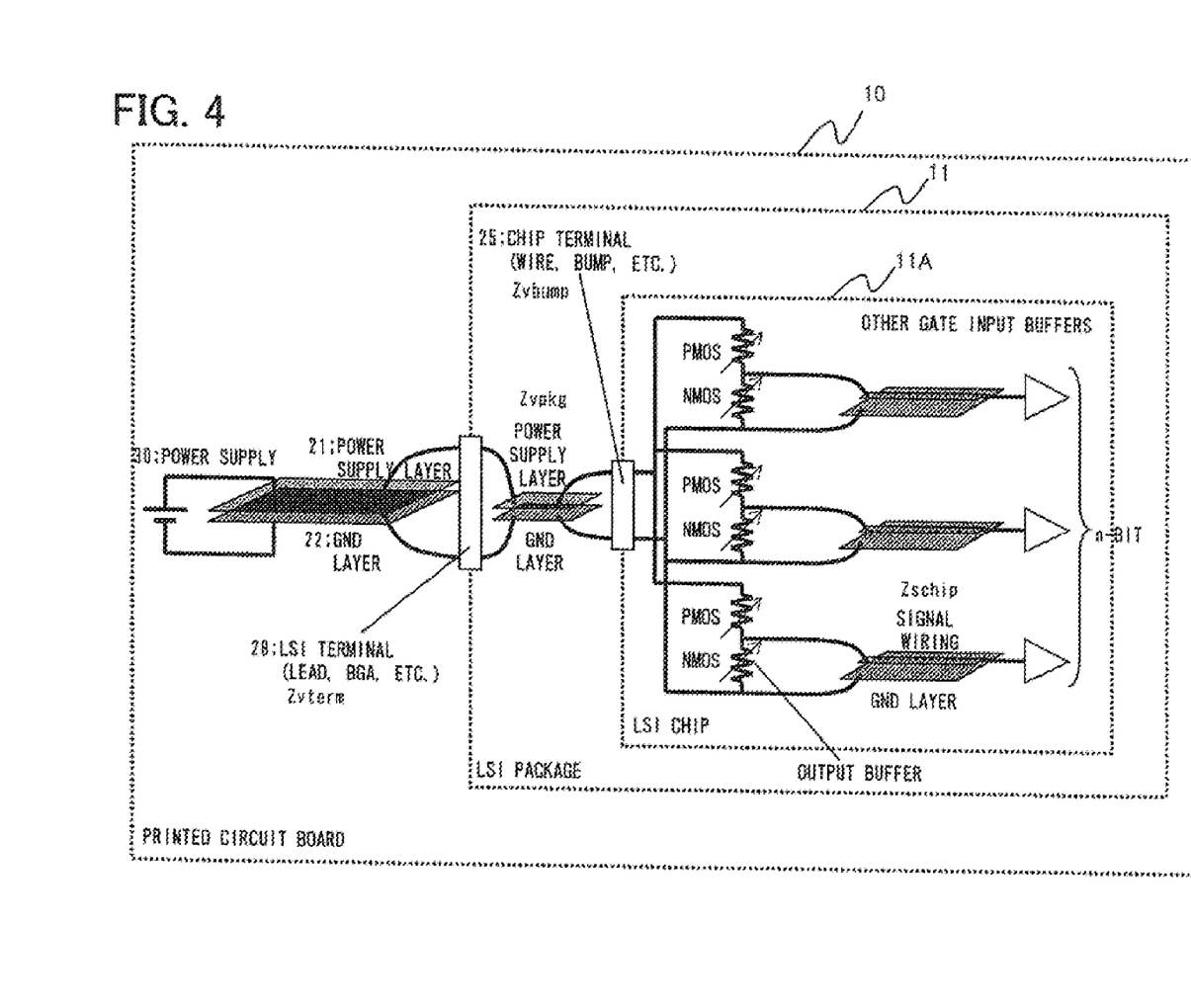
FIG. 4 is a diagram schematically showing an internal configuration of an LSI chip mounted on the printed circuit board.

FIG. 4 is a diagram schematically showing an internal configuration (provided with n bit equivalent output buffers) of an LSI chip mounted on the printed circuit board 10. In case of an LSI internal circuit, although the number of internal output gates in the chip and characteristic impedance of the chip internal wiring (for example aluminum wiring) are required, the fundamental concept is the same as in FIG. 3.

From the LSI design information IA, assuming that the number of internal output gates inside the chip is n;

an Output impedance is Rout, a characteristic impedance of the power supply-to-ground of the LSI terminal part is Zvterm;

a characteristic impedance of the power supply-to-ground of the LSI package part is Zvpkg;

a characteristic impedance of the power supply-to-ground of a chip terminal part is Zsbump; and a characteristic impedance of the chip internal wiring (for example, aluminum wiring) is Zschip, an input impedance between the power supply and ground of the LSI is calculated by Equation (8).

$$Zlsi = Zvterm + Zvpkg + Zvbump + \{Rout + Zschip\}/n \quad (8)$$

A model is represented in which power energy supplied from the power supply-ground of the printed circuit board is converted to signal propagation energy by the semiconductor (output buffer), and signal propagation is performed to other LSIs. In addition, FIG. 4 illustrates energy propagation of the internal circuit of the LSI itself, not of signals between LSIs.

Power supply and ground of a printed circuit board may be approximated by a model in which transmission lines are laid out in a mesh, as in FIG. 5. Power supply and ground planes of FIG. 5A is approximated (is modeled) by a transmission line model as shown in FIG. 5B, or a mesh structure including resistors, capacitors, inductors, as shown in FIG. 5C. FIG. 5C is a diagram showing one example in which a two dimensional transmission line model of FIG. 5B is modeled using L (inductors), C (capacitors), and R (resistors).

Figure 5A:
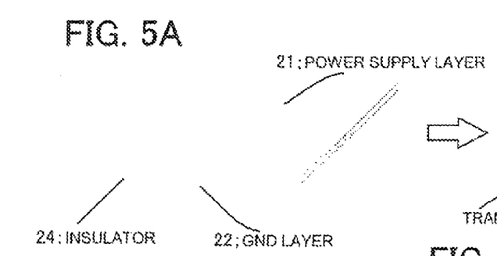
FIG. 5 is a diagram describing a power supply-ground plane model.
Figure 5B:
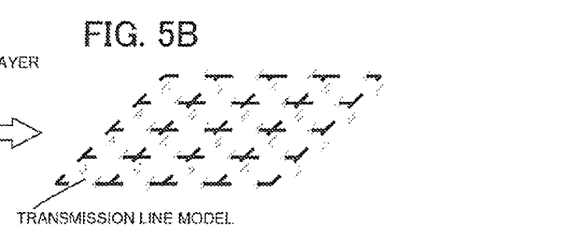
Figure 5C:
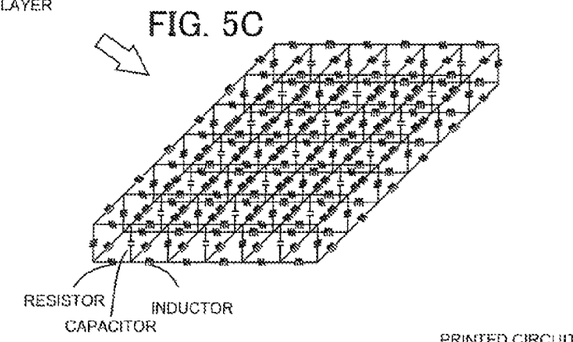
Figure 5D:
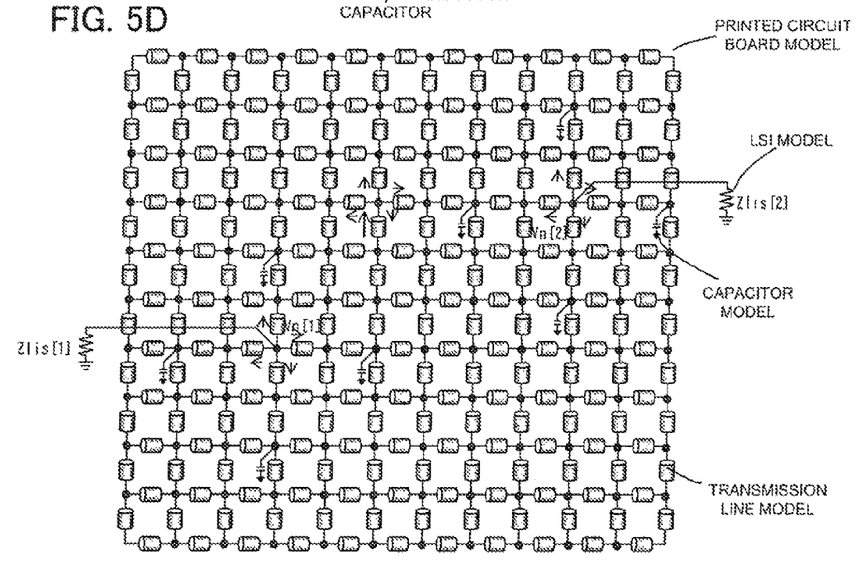

FIG. 5D is a model in which two LSIs and several bypass capacitors are mounted on a printed circuit board. For convenience, the LSI model is represented by a pure resistor, and the capacitor model is represented by a capacitors. These models have an impedance characteristic with a frequency characteristic. In FIG. 5D, for the sake of simplification, the configuration in which two LSIs are mounted (the LSI model has 2 LSIs, Zlsi[1] and Zlsi[2]) is shown. In an actual analysis, the power supply noise analysis is performed using characteristic impedance data of LSIs and semiconductor components mounted on the printed circuit board. With regard to the power supply and ground of the printed circuit board, as shown in FIGS. 5A through 5C, a parallel plate capacitor of the power supply and ground layers is divided into a mesh structure. Although the example shown in FIG. 5D has a configuration in which there is one power supply layer and one ground layer, there may be plural power supply and ground layers. In such a case, it is necessary to perform modeling giving consideration to coupling of the respective power supply layers and the ground layers. In this mesh-type model, an analysis model is configured by connecting the LSI and capacitor models in respective mounting positions on the electronic circuit board. A capacitor model is shown as a series circuit of capacitance (C), Equivalent Series Resistance (ESR), and Equivalent Series inductance (ESL).

A power supply noise analysis method using the model shown in FIG. 5D will be described. With regard to a first LSI (LSI model Zlsi[1]), a reflected voltage Vn[1] is propagated in four directions in a transmission line network on the printed circuit board.

In FIG. 5D, four transmission lines are connected in common to one connection point (node), and for each line, noise of amplitude Vn[1]/4 is propagated. If noise propagating through an arbitrary transmission line collides with a subsequent connection point, a reflection/transmission phenomenon occurs. With all the transmission lines having the same impedance, since one transmission line branches into three, the characteristic impedance is equivalent to being connected to ⅓ of the transmission lines.

In this regard, $$[\text{reflected noise amplitude}] = [\text{original amplitude}] \cdot (Z0/3 - Z0)/(Z0/3 + Z0) = -[\text{original amplitude}]/2 \quad (9)$$

$$[\text{transmitted noise amplitude for one line}] = ([\text{original amplitude}] - [\text{reflected amplitude}])/3 = [\text{original amplitude}]/2 \quad (10)$$

Therefore, as propagation progresses, the amplitude decreases.

Every time reflection collides with a connection point, the reflection/transmission is repeated, and the noise is propagated to the entirety of the circuit board, like a wave pattern spreading out. The above Equations (9) and (10) are effective for a model in which four transmission lines are connected to one node. Equations may become different for a different model.

By repetition of this type of calculation, noise generated by the LSI spreads over the entirety of the printed circuit board, and respective amounts of power supply noise can be calculated.

Next, a similar calculation is made with regard to a second LSI (LSI model Zlsi[1]; i is a natural number and is an LSI identification value) of FIG. 5D. When three or more LSIs are mounted on the printed circuit board, the calculation is performed for all the LSIs.

Next, taking the sum of the amounts of power supply nose of all the LSIs mounted on the printed circuit board, from the principle of superposition, means calculating the power supply noise giving consideration to all the LSIs. A mechanism of power supply noise generation can be reproduced, and it is possible to grasp the power supply noise at a design stage of the printed circuit board.

Figure 6A:
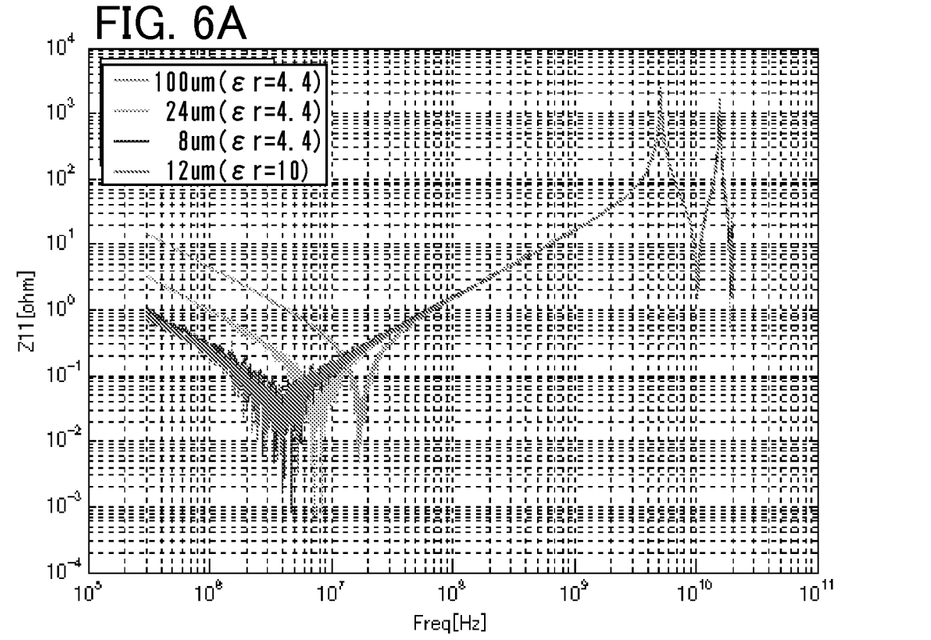
FIG. 6 is a diagram showing an impedance characteristic of power supply-ground.
Figure 6B:
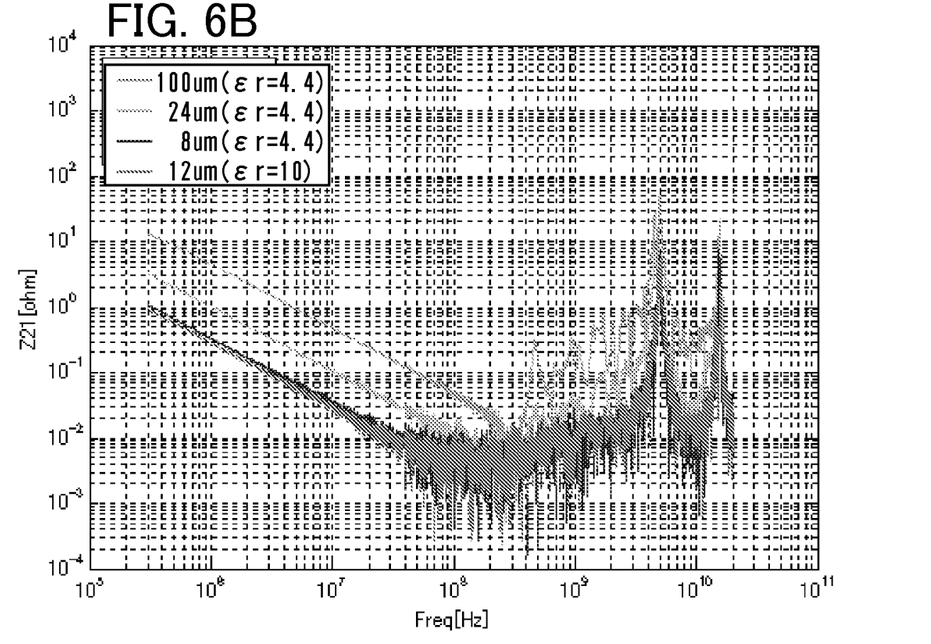

An example of calculation of the reflected impedance characteristic (Z11) between a power supply and ground of a printed circuit board and of a transmission impedance characteristic (Z21) is shown in FIGS. 6A and 6B. A horizontal axis is a frequency (logarithmic scale). In FIG. 6A and FIG. 6B, $\in r$ in "100 um ($\in r=4.4$)" is a dielectric constant of an insulator (dielectric) of a parallel plate capacitor (for example, a capacitor formed from parallel plates that are the power supply layer 21 and the ground layer 22, and the insulating layer 24 therebetween, of FIG. 5A), and 100 um (micrometers) is the thickness of the insulator (dielectric).

Figure 6C:
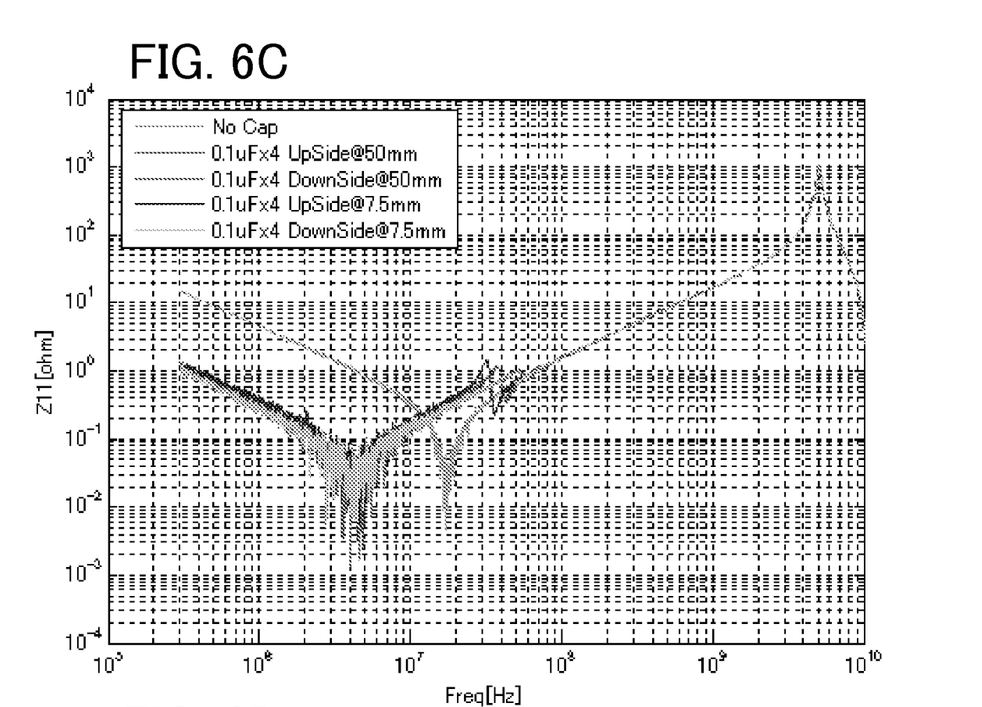
Figure 6D:
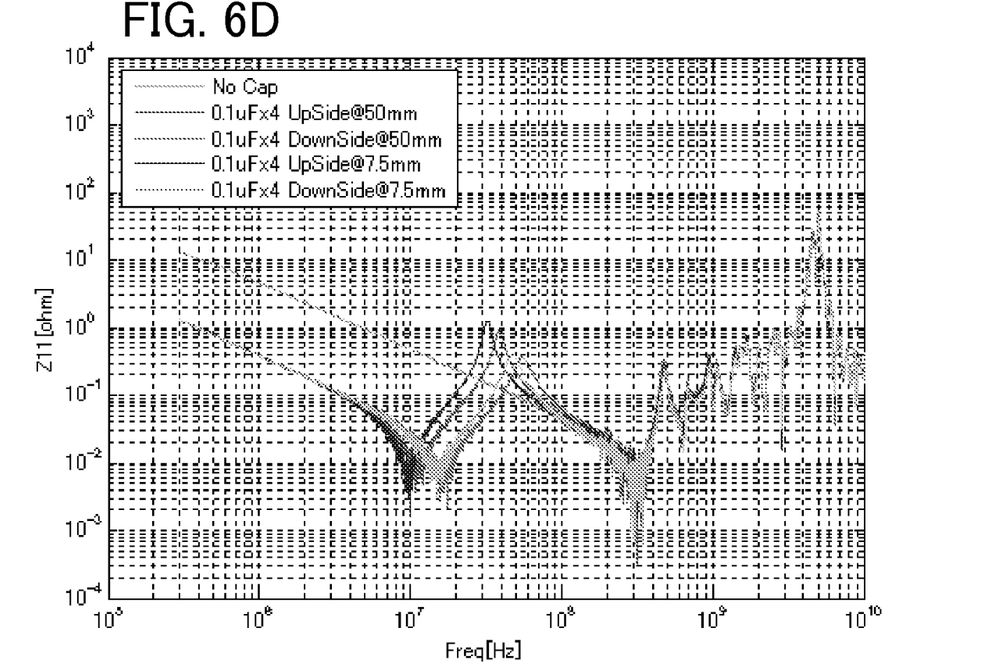

By mounting a bypass condenser (capacitor) on the printed circuit board, the impedance characteristics (reflected impedance characteristic (Z11), transmission impedance characteristic (Z21)) change as in FIG. 6C and FIG. 6D. By mounting the bypass condenser (capacitor) on the printed circuit board, it is shown that the impedance characteristic of the whole printed circuit board changes. Even with a capacitor of the same capacitance, when the mounting position changes, the characteristic itself is shown to change. In FIGS. 6C and 6D, "No Cap" indicates that there is no capacitor. "0.1 uF×4 Upside@50 mm" represents a case in which 4 capacitors of capacitance 0.1 uF (microfarads) are disposed on a electronic components face side, 50 mm apart from each other. In addition, "0.1 uF×4 Downside@50 mm" represents a case in which 4 capacitors of capacitance 0.1 uF (microfarads) are disposed on a solder face side, 50 mm apart from each other.

An LSI itself also has an input impedance between the power supply and ground, and impedance mismatching occurs at a point of contact with the printed circuit board (refer to FIG. 7B), and reflection theory holds.

In this way, reflection analysis with arbitrary LSI and the printed circuit board is performed, and by superimposing reflected waves, the power supply noise can be analyzed.

Next, the verification of design validity of a printed circuit board according to the present invention will be described.

It is assumed that a model of of the i-th LSI is Zlsi[i] (where i is a natural number and is an LSI identification value);
the power supply voltage of the LSI is VDD; and
the power supply tolerance value required by the LSI is $\pm \Delta V$ (where $\Delta V$ is a positive value).

As in the model of FIG. 7A, when the reflected impedance characteristic Z11[i] of the entirety of the printed circuit board omitting the i-th LSI and the input impedance Zlsi[i] of the LSI are connected, and VDD is divided by $Z11[i]$ and $Zlsi[i]$, a potential at this interface is:

$$Zlsi[i] \times VDD/(Zlsi[i]+Z11[i]) \quad (11)$$

When an internal circuit of an LSI is in an off state by switching operation in the LSI, since the potential of this boundary is VDD, the input voltage $Vin[i]$ supplied from the printed circuit board ($Z11[i]$) to the LSI ($Zlsi[i]$), as described in the abovementioned Equation (3), is $$Vin[i] = VDD - \{Zlsi[i] \times VDD/(Zlsi[i] + Z11[i])\} \quad (12)$$
$$= Z11[i] \times VDD/(Zlsi[i] + Z11[i])$$

By the above description, since the power supply noise is obtained from the reflection analysis, by the input impedance $Zlsi[i]$ of the i-th LSI and the reflected impedance characteristic $Z11[i]$ of the entirety of the printed circuit board omitting the i-th LSI, a reflection relationship Equation (13) holds true.

$$Vr[i]/Vin[i] = (Zlsi[i]-Z11[i])/(Zlsi[i]+Z11[i]) \quad (13)$$

Here, in general in an LSI, a power supply noise amount that assures operation is prescribed. This is taken as $\pm \Delta V$ (where $\Delta V$ is a positive number).

Since it is necessary to suppress the reflected voltage $Vr[i]$ within a range of $\pm \Delta V$, it is necessary to satisfy a relationship:

$$\Delta V \geq |Vr[i]| \quad (14)$$

$$\Delta V \geq |Vin[i] \times (Zlsi[i]-Z11[i])/(Zlsi[i]+Z11[i])| = |\{Z11[i] \times VDD/(Zlsi[i]+Z11[i])\} \times \{(Zlsi[i]-Z11[i])/(Zlsi[i]+Z11[i])\}| \quad (15)$$

(Note that || means "absolute value").
With $$\Delta V/VDD = v \quad (16)$$

($\pm v$ is a allowable voltage variation rate), if Equation (15) is expanded, the following Equation (17) is obtained.

$$-v \leq \{Z11[i] \times VDD/(Zlsi[i]+Z11[i])\} \times \{(Zlsi[i]-Z11[i])/(Zlsi[i]+Z11[i])\} \leq v \quad (17)$$

From Equation (17), an allowable range of $Z11[i]$ is obtained.

That is, from the left side of Equation (17):

$$(-v \leq \{Z11[i] \times VDD/(Zlsi[i]+Z11[i])\} \times \{(Zlsi[i]-Z11[i])/(Zlsi[i]+Z11[i])\}), (1-v)Z11[i]^2 - (2v+1)Zlsi[i]Z11[i] - vZlsi[i]^2 \leq 0 \quad (18)$$

("^2" indicates "power of 2").
If the second order inequality (18) relating to $Z11[i]$ is solved:

$$\{2v+1-\sqrt{(8v+1)}\} \times Zlsi[i]/\{2(1-v)\} \leq Z11[i] \leq \{2v+1+\sqrt{(8v+1)}\} \times Zlsi[i]\{2(1-v)\} \quad (19)$$

($\sqrt{()}$ indicates "square root").
From the right side of Equation (17):
$(\{Z11[i] \times VDD/(Zlsi[i]+Z11[i])\} \times \{(Zlsi[i]-Z11[i])/(Zlsi[i]+Z11[i])\} \leq v)$, the following holds:

$$(1+v)Z11[i]^2 + (2v-1)Zlsi[i]Z11[i] + vZlsi[i]^2 \geq 0 \quad (20)$$

If the second order inequality (20) relating to $Z11[i]$ is solved, $$Z11[i] \leq \{1-2v-\sqrt{(1-8v)}\} \times Zlsi[i]/\{2(1+v)\}, \text{ or}$$

$$\{1-2v+\sqrt{(1-8v)}\} \times Zlsi[i]/(2(1+v)) \leq Z11[i] \quad (21)$$

A condition satisfying both relations (20) and (21) is a judgment condition for $Z11[i]$. Conditional expression of inequalities (20) and (21) are both represented by coefficients of $Zlsi[i]$.

That is, if the input impedance $Zlsi[i]$ of the LSI is solved, it is possible to obtain the characteristic impedance $Z11[i]$ between the power supply and ground of the printed circuit board. $Z11[i]$ is referred to as "target impedance".

In order to easily grasp the conditions of inequalities (20) and (21), the coefficient of $Zlsi[i]$ will be analyzed.

The coefficients of $Zlsi[i]$ are a function of v, represented by $f(v)$, $$f(v) = \{2v+1-\sqrt{(8v+1)}\}/\{2(1-v)\} \quad (22) \text{ (left side of Equation (19))}$$

$$f(v) = \{2v+1+\sqrt{(8v+1)}\}/\{2(1-v)\} \quad (23) \text{ (right side of Equation (19))}$$

$$f(v) = \{1-2v-\sqrt{(1-8v)}\}/\{2(1+v)\} \quad (24) \text{ (first Equation of Equations (21))}$$

$$f(v) = \{1-2v+\sqrt{(1-8v)}\}/(2(1+v)) \quad (25) \text{ (second Equation of Equations (21))}$$

Figure 8:
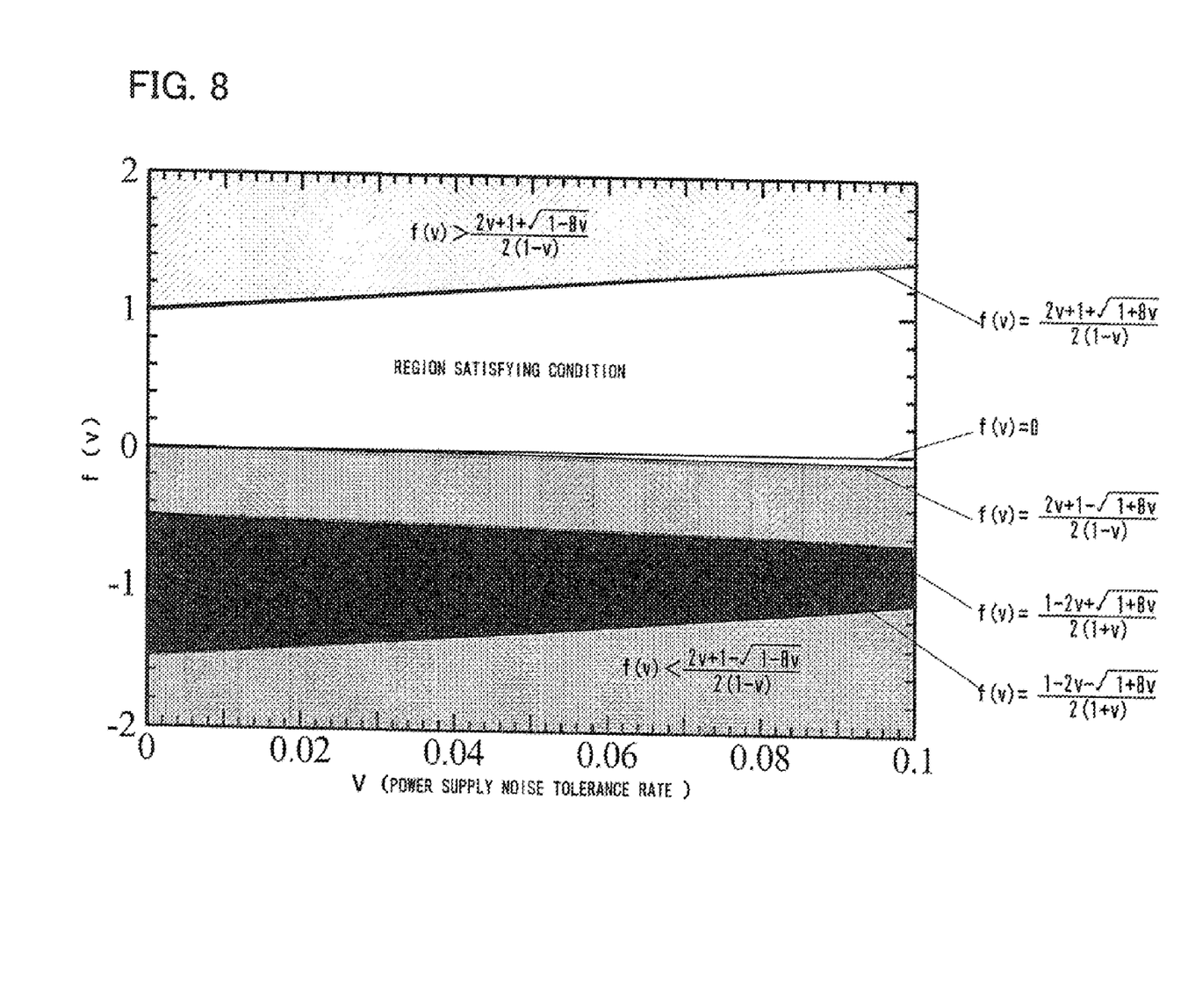
FIG. 8 is a diagram describing validity verification of the exemplary embodiment of the present invention.

FIG. 8 shows a graph of $f(v)$. In FIG. 8, unfit regions are hatched, in accordance with the conditions of Equation (19) and (21).

Since $Z11[i]$ cannot have a negative characteristic impedance, a region corresponding to $f(v)<0$ is also hatched.

A region that is not hatched is a region satisfying these conditions. That is, the target impedance $Z11[i]$ to be obtained is:

$$0 \leq Z11[i] \leq \{2v+1+\sqrt{(8v+1)}\} \times Zlsi[i]/\{2(1-v)\} \quad (26)$$

In the above, there is described the principle of operation in the present invention. The processing flow and a configuration of an entire system for verifying validity of power supply noise according to the invention will be described with reference to FIG. 1.

In order to perform noise analysis according to the above described reflection theory, power supply-ground information of the circuit board is extracted from electronic circuit board information 1 (step S11). According to the model as in FIG. 5, it is easy to calculate the impedance characteristic shown in FIG. 6A and FIG. 6B.

Next, connection information of a capacitor (bypass condenser) connected to power supply-ground is extracted (step S12), and a capacitor characteristic database 2 is called (step S14). The capacitor model is shown as a circuit, not of pure capacitance, but of capacitance (C), Equivalent Series Resistance (ESR), and Equivalent Series inductance (ESL) connected in series. The capacitor model may be obtain by calculating power supply-to-ground impedance (Z parameter) from an actual measurement (LCR meter measured value), or by measuring an S parameter S11 and converting the S parameter to a Z parameter to obtain impedance characteristic. Or, the impedance characteristic may be obtained from simulation. The power supply-ground impedance of the capacitor is recorded as component information in advance in the capacitor characteristic database 2 (step S15 in FIG. 1).

Next, a combined impedance characteristic of the circuit board and the bypass condenser (capacitor) is calculated (step S18). This is equivalent to characteristics of FIG. 6C and FIG. 6D.

With regard to LSI modeling, LSI information is extracted from the electronic circuit design information 1 (step S13), an LSI characteristic database 3 is called (step S17), and the LSI characteristic information is used. Although no particular limitation is imposed on the present invention, in the LSI modeling, a model that is described referring to, for example, FIG. 3 and FIG. 4, is utilized. In FIG. 3, assuming that the number of output buffers of the LSI is n;

an output impedance of an output buffer of the LSI is Rout; the characteristic impedance between the power supply and ground of the LSI terminal part is Zvterm;

a characteristic impedance of a signal is Zsterm, a characteristic impedance between the power supply and ground of the LSI package part is Zvpkg; and a characteristic impedance of signal is Zspkg;

a characteristic impedance between the power supply and ground of the chip terminal part is Zvbump;

a characteristic impedance of signal is as Zsbump;

a characteristic impedance of a wiring pattern connected to a terminal of an output buffer of the LSI is Z0, and a resistance value of damping resistor is Rs, if the damping resistor is mounted on the wiring pattern, an input impedance Zlsi between the power supply and ground of the LSI is calculated by:

$$Zlsi = Zvterm + Zvpkg + Zvbump + \{Rout + Zsbump + Zspkg + Zsterm + Rs + Z0\}/n \quad (27)$$

In FIG. 4, assuming that the number of internal gates of the LSI is n;

an output impedance being Rout, characteristic impedances between the power supply and ground of the LSI terminal part, the package part, the chip terminal part, are Zvterm, Zvpkg, and Zvump, respectively, and the characteristic impedance of wiring in the chip is Zschip, the input impedance Zlsi between the power supply and ground of the LSI is calculated by:

$$Zlsi = Zvterm + Zvpkg + Zvbump + (Rout + Zschip)/n \quad (28)$$

Figure 1:
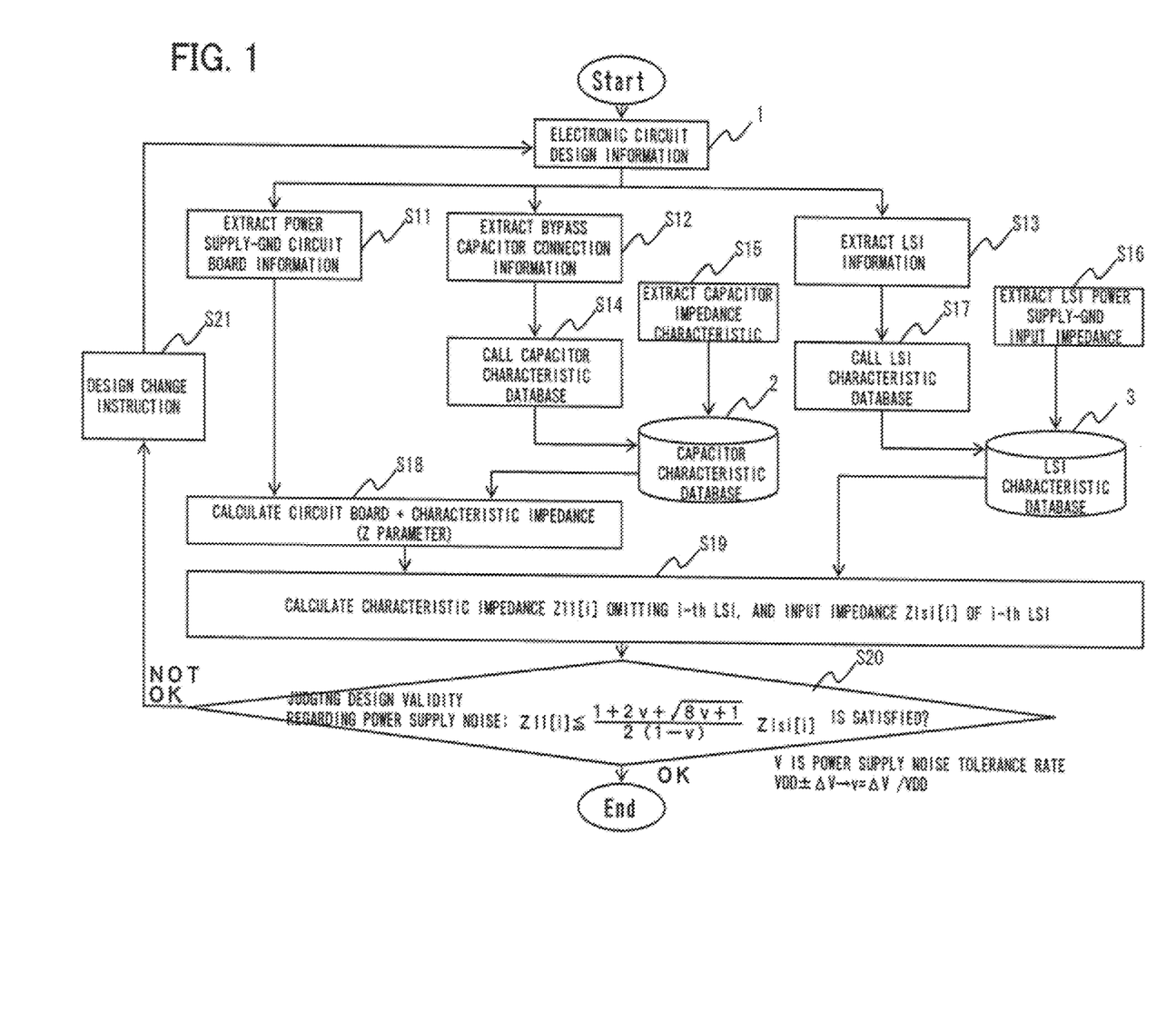
FIG. 1 is a diagram describing a procedure of one exemplary embodiment of the present invention.

The power supply-to-ground input impedance model of the LSI is recorded in advance in the LSI characteristic database 3 (step S16).

A model (input impedance) Zlsi[i] of the i-th LSI that is a target, and a model (reflected impedance) Z11[i] omitting the bypass condenser (apacitor) and the i-th LSI on the printed circuit board are calculated (step S19).

According to the abovementioned Equation (25), with regard to Zlsi[i] and a ratio v (=ΔV/VDD) of the power supply variation tolerance range ΔV and the power supply voltage VDD, according to whether or not Z11[i] satisfies $$Z11[i] \leq \{1 + 2v + \sqrt{(8v+1)}\}Zlsi[i]/\{2(1-v)\}$$

a judgment is made of design validity with regard to power supply noise (step S20).

With regard to all LSIs mounted on the printed circuit board, if a judgment of design validity in step S20 of FIG. 1 is OK, the verification is completed.

When the judgment of design validity in step S20 is not OK, by issuing a design change instruction (step S21) and providing design feedback, a design change can be made and design quality can be assured. Each step (function, means) in FIG. 1 clearly may be realized by a program implemented on a computer.

According to the present exemplary embodiment, by analyzing the power supply noise based on the reflection theory, it is possible to clarify a standard of judging design validity. In addition, according to the present exemplary embodiment, it is possible to facilitate confirming of design of power supply-to-ground, in order to stably operate LSIs, and to contribute to improvement of design quality.

In the present invention, a system and method are proposed in which, according to a viewpoint of causing an LSI to operate stably, an validity judgment is made from the power supply noise tolerance value required by a single LSI unit. As another exemplary embodiment of the present invention, are envisioned, and, using transmission impedance from a certain LSI to another LSI, it is possible to realize verification taking into account a tolerance value given to the other LSI.

Modifications and adjustments of exemplary embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. That is, the present invention clearly includes every type of transformation and modification that a person skilled in the art can realize according to technological concepts and the entire disclosure including the scope of the claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A computer-implemented method of verifying design validity of an electronic circuit board on which a semiconductor device is mounted, the computer-implemented method comprising:

obtaining a reflected voltage at the semiconductor device with respect to a voltage inputted to the semiconductor device from the electronic circuit board side; and making a judgment as to whether or not the reflected voltage is within a tolerance range of power supply variation that assures operation of the semiconductor device to perform verification of design validity, wherein, assuming that n (n is a prescribed positive integer) semiconductor devices are mounted on the electronic circuit board, a voltage Vin[i] inputted to the semiconductor device from the electronic circuit board is given by $$Vin[i] = VDD - Zlsi[i] \times VDD/(Zlsi[i] + Z11[i])$$

where Zlsi[i] is an input impedance characteristic of an i-th (i=1 to n) of the semiconductor devices, Z11[i] is a reflected impedance characteristic which is viewed from a position at which the i-th semiconductor device is mounted and which is a characteristic with the i-th semiconductor device omitted from the electronic circuit board, and VDD is a power supply voltage; and the reflected voltage Vr[i] is obtained from $$Vr[i] = Vin[i] \times (Zlsi[i] + Z11[i])/(Zlsi[i] - Z11[i]); \text{ and}$$

a judgment is made as to whether or not a condition that an absolute value |Vr[i]| of the reflected voltage Vr[i] is less than or equal to a power supply variation tolerance range ΔV, $$|Vr[i]| \leq \Delta V$$

is satisfied.

2. The computer-implemented method of claim 1, further comprising obtaining a reflected voltage at the semiconductor device with respect to an input voltage from the electronic circuit board side, from a reflection coefficient determined based on a power supply-to-ground input impedance of the semiconductor device mounted on the electronic circuit board, and a reflected impedance characteristic of the electronic circuit board omitting the semiconductor device.

3. The computer-implemented method of claim 1, wherein with v=ΔV/VDD, which is a ratio of the power supply variation tolerance range ΔV and the power supply voltage VDD, when there is a semiconductor device for which Z11[i] and Zlsi[i] do not satisfy the following conditional expression:

$$0 \leq Z11[i] \leq \{2v+1+\sqrt{(8v+1)}\} \times Zlsi[i]/\{2(1-v)\}$$

a judgment is made that a design is not valid, and when the conditional expression is satisfied for each of all semiconductor devices mounted on the electronic circuit board, a judgment is made that the design is valid.

4. The computer-implemented method of claim 1, further comprising:

extracting power supply-to-ground information from design information of the electronic circuit board, and calculating an impedance characteristic of the electronic circuit board;

extracting connection information of a bypass capacitor connected between power supply and ground of the electronic circuit board, and calculating an impedance characteristic Z11 of the electronic circuit board and the bypass capacitor combined;

calculating a reflected impedance characteristic Z11[i] which is viewed from a position at which the i-th semiconductor device is mounted and which is a characteristic with the i-th semiconductor device omitted, and calculating an input impedance Zlsi[i] between the power supply and ground of the i-th semiconductor device; and with regard to v=ΔV/VDD which is a ratio of the power supply variation tolerance range ΔV and the power supply voltage VDD, checking whether or not the relation $$0 \leq Z11[i] \leq \{2v+1+\sqrt{(8v+1)}\} \times Zlsi[i]/\{2(1-v)\}$$

is satisfied for the semiconductor device mounted on the electronic circuit board.

5. An apparatus for verifying design validity of an electronic circuit board on which a semiconductor device is mounted, the apparatus comprising:

a section that obtains a reflected voltage at the semiconductor device with respect to a voltage inputted to the semiconductor device from the electronic circuit board side;

a section that makes a judgment as to whether or not the reflected voltage is within a tolerance range of power supply variation that assures operation of the semiconductor device to perform verification of design validity, wherein, assuming that n (n is a prescribed positive integer) semiconductor devices are mounted on the electronic circuit board, a voltage Vin[i] inputted to the semiconductor device from the electronic circuit board is given by $$Vin[i]=VDD-Zlsi[i] \times VDD/(Zlsi[i]+Z11[i])$$

where Zlsi[i] is an input impedance characteristic of an i-th (i=1 to n) of the semiconductor devices;

Z11[i] is a reflected impedance characteristic which is viewed from a position at which the i-th semiconductor device is mounted and which is a characteristic with the i-th semiconductor device omitted from the electronic circuit board, and VDD is a power supply voltage; and wherein
the section that obtains a reflected voltage, obtains the reflected voltage Vr[i] at the semiconductor device from $$Vr[i]=Vin[i] \times (Zlsi[i]+Z11[i])/(Zlsi[i]-Z11[i]), \text{ and}$$

the section that makes a judgment, makes a judgment as to whether or not a condition that an absolute value |Vr[i]| of the reflected voltage Vr[i] is less than or equal to a power supply variation tolerance range ΔV, $$|Vr[i]| \leq \Delta V$$

is satisfied.

6. The apparatus according to claim 5, wherein the section that obtains a reflected voltage, obtains a reflected voltage at the semiconductor device with respect to an input voltage from the electronic circuit board side, from a reflection coefficient which is determined based on a power supply-to-ground input impedance of the semiconductor device mounted on the electronic circuit board, and a reflected impedance characteristic of the electronic circuit board omitting the semiconductor device.

7. The apparatus according to claim 5, wherein,
with v=ΔV/VDD, which is a ratio of the power supply variation tolerance range ΔV and the power supply voltage VDD, the section that makes a judgment, makes a judgment that a design is not valid, when there is a semiconductor device for which Z11[i] and Zlsi[i] do not satisfy the following conditional expression:

$$0 \leq Z11[i] \leq \{2v+1+\sqrt{(8v+1)}\} \times Zlsi[i]/\{2(1-v)\} \text{ and}$$

makes a judgment that the design is valid, when the conditional expression is satisfied for each of all semiconductor devices mounted on the electronic circuit board.

8. The apparatus according to claim 5, the apparatus comprising:

a section that extracts power supply-to-ground information from design information of the electronic circuit board, and calculates an impedance characteristic of the electronic circuit board;

a section that extracts connection information of a bypass capacitor connected between power supply and ground of the electronic circuit board, and calculates an impedance characteristic Z11 of the electronic circuit board and the bypass capacitor combined;

a section that calculates a reflected impedance characteristic Z11[i] which is viewed from a position at which the i-th semiconductor device is mounted and which is a characteristic with the i-th semiconductor device omitted, and calculates an input impedance Zlsi[i] between the power supply and ground of the i-th semiconductor device; and a section that, with regard to v=ΔV/VDD which is a ratio of the power supply variation tolerance range ΔV and the power supply voltage VDD, checks whether or not the relation $$0 \leq Z11[i] \leq \{2v+1+\sqrt{(8v+1)}\} \times Zlsi[i]/\{2(1-v)\}$$

is satisfied for the semiconductor device mounted on the electronic circuit board.

9. A non-transitory computer readable medium containing computer instructions stored therein for causing a computer processor to perform processing for verifying design validity of an electronic circuit board on which a semiconductor device is mounted, the processing comprising:

obtaining a reflected voltage at the semiconductor device with respect to a voltage inputted to the semiconductor device from the electronic circuit board side; and making a judgment as to whether or not the reflected voltage is within a tolerance range of power supply variation that assures operation of the semiconductor device to perform verification of design validity, wherein, assuming that n (n is a prescribed positive integer) semiconductor devices are mounted on the electronic circuit board, a voltage Vin[i] inputted to the semiconductor device from the electronic circuit board is given by $$Vin[i]=VDD-Zlsi[i]\times VDD/(Zlsi[i]+Z11[i])$$

where Zlsi[i] is an input impedance characteristic of an i-th (i=1 to n) of the semiconductor devices, Z11[i] is a reflected impedance characteristic which is viewed from a position at which the i-th semiconductor device is mounted and which is a characteristic with the i-th semiconductor device omitted from the electronic circuit board, and VDD is a power supply voltage; and the program causing the computer to execute the following processing comprising:

obtaining the reflected voltage Vr[i] from $$Vr[i]=Vin[i]\times(Zlsi[i]+Z11[i])/(Zlsi[i]-Z11[i]); \text{ and}$$

making a judgment as to whether or not a condition that an absolute value |Vr[i]| of the reflected voltage Vr[i] is less than or equal to a power supply variation tolerance range ΔV, $$|Vr[i]|\leq\Delta V$$

is satisfied.

10. The non-transitory computer readable medium according to claim 9, wherein the computer instructions stored therein further cause a computer processor to perform obtaining a reflected voltage at the semiconductor device with respect to an input voltage from the electronic circuit board side, from a reflection coefficient determined based on a power supply-to-ground input impedance of the semiconductor device mounted on the electronic circuit board, and a reflected impedance characteristic of the electronic circuit board omitting the semiconductor device.

11. The non-transitory computer readable medium according to claim 9, wherein the computer instructions stored therein further cause a computer processor to perform processing comprising:

with v=ΔV/VDD, which is a ratio of the power supply variation tolerance range ΔV and the power supply voltage VDD, making a judgment that a design is not valid, when there is a semiconductor device for which Z11[i] and Zlsi[i] do not satisfy the following conditional expression:

$$0\leq Z11[i]\leq\{2v+1+\sqrt{(8v+1)}\}\times Zlsi[i]/\{2(1-v)\} \text{ and}$$

making a judgment that the design is valid, when the conditional expression is satisfied for each of all semiconductor devices mounted on the electronic circuit board.

12. The non-transitory computer readable medium according to claim 9, wherein the computer instructions stored therein further cause a computer processor to perform processing comprising:

extracting power supply-to-ground information from design information of the electronic circuit board, and calculating an impedance characteristic of the electronic circuit board;

extracting connection information of a bypass capacitor connected between power supply and ground of the electronic circuit board, and calculating an impedance characteristic Z11 of the electronic circuit board and the bypass capacitor combined;

calculating a reflected impedance characteristic Z11[i] which is viewed from a position at which the i-th semiconductor device is mounted and which is a characteristic with the i-th semiconductor device omitted, and calculating an input impedance Zlsi[i] between the power supply and ground of the i-th semiconductor device; and with regard to v=ΔV/VDD which is a ratio of the power supply variation tolerance range ΔV and the power supply voltage VDD, checking whether or not the relation $$0\leq Z11[i]\leq\{2v+1+\sqrt{(8v+1)}\}\times Zlsi[i]/\{2(1-v)\}$$

is satisfied for the semiconductor device mounted on the electronic circuit board.

13. A non-transitory computer readable recording medium storing the program as set forth in claim 9.

* * * * *